(12) United States Patent
John

(10) Patent No.: US 7,830,565 B2
(45) Date of Patent: Nov. 9, 2010

(54) IMAGE CAPTURE DEVICE WITH ROLLING BAND SHUTTER

(75) Inventor: George C. John, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 1170 days.

(21) Appl. No.: 11/426,618

(22) Filed: Jun. 27, 2006

(65) Prior Publication Data

US 2007/0297026 A1 Dec. 27, 2007

(51) Int. Cl.
H04N 1/46 (2006.01)

(52) U.S. Cl. .................... 358/514; 358/909.1; 358/1.2; 358/475; 382/274; 382/275; 348/208.99; 348/294; 375/240.16

(58) Field of Classification Search ................ 358/474, 358/1.2, 3.26, 509, 475, 473, 906, 909.1, 358/520, 523, 540, 538, 504, 482, 483, 463, 358/527; 382/107, 236, 274, 275, 319, 318; 348/208.99, 208.4, 294, 296, 699, 416.1, 348/376; 375/240.16, E7.107, 631
See application file for complete search history.

(56) References Cited

U.S. PATENT DOCUMENTS

| | | | |
|---|---|---|---|
| 5,157,742 A | | 10/1992 | Niihara |
| 5,210,559 A | | 5/1993 | Ohki |
| 5,253,071 A | | 10/1993 | MacKay |
| 5,410,347 A | * | 4/1995 | Steinle et al. ............... 348/270 |
| 5,576,772 A | * | 11/1996 | Kondo ....................... 348/699 |
| 5,623,305 A | | 4/1997 | Ishizuka et al. |
| 5,842,054 A | | 11/1998 | Suzuki et al. |
| 5,946,032 A | | 8/1999 | Ishizuka et al. |
| 5,966,173 A | * | 10/1999 | Inuiya et al. ................ 348/296 |
| 6,009,336 A | | 12/1999 | Harris et al. |
| 6,154,519 A | * | 11/2000 | Florent et al. ................ 378/62 |
| 6,567,469 B1 | * | 5/2003 | Rackett .................. 375/240.16 |
| 6,618,173 B1 | * | 9/2003 | Nobel et al. ................ 358/513 |
| 6,642,964 B1 | * | 11/2003 | Perregaux et al. ........... 348/315 |
| 6,760,485 B1 | * | 7/2004 | Gilman et al. .............. 382/274 |
| 6,801,250 B1 | | 10/2004 | Mayashita |
| 6,934,332 B1 | * | 8/2005 | Auyeung et al. ....... 375/240.16 |
| 6,961,157 B2 | * | 11/2005 | Tandon et al. ............... 358/512 |

(Continued)

FOREIGN PATENT DOCUMENTS

WO   WO/02/19030 A1   3/2002

*Primary Examiner*—Negussie Worku
(74) *Attorney, Agent, or Firm*—Hisashi D. Watanabe; Philip H. Burrus, IV

(57) ABSTRACT

A device and method for compensating for motion in image capture are provided. A processor (205) initiates partially concurrent scanning sweeps (208,209) across a digital image sensor (203) to obtain sets of digital values (210,211). At least a first set of digital values (210) and a second set of digital values (211) are stored in memory (206). An image construction module (213) compares ones of the first set of digital values (210) with ones of the second set of digital values (211) to estimate an amount of motion. The estimation may be accomplished by determining a moment between the first set of digital values (210) and the second set of digital values (211). Upon compensating for any motion, resulting digital values (412) are written to memory (206) as a compensated image. To improve an overall signal to noise ratio, noise reduction filters may also be applied to the first set of digital values (210), the second set of digital values (211), or combinations thereof.

20 Claims, 5 Drawing Sheets

U.S. PATENT DOCUMENTS

| | | | |
|---|---|---|---|
| 7,046,401 B2 * | 5/2006 | Dufaux et al. | 358/450 |
| 7,061,524 B2 * | 6/2006 | Liu et al. | 348/208.4 |
| 7,164,496 B2 * | 1/2007 | Tatsumi | 358/1.9 |
| 7,236,190 B2 * | 6/2007 | Yanof et al. | 348/222.1 |
| 7,251,057 B2 * | 7/2007 | Tsujino et al. | 358/1.9 |
| 7,433,538 B2 * | 10/2008 | Kusakabe et al. | 382/275 |
| 7,443,548 B2 * | 10/2008 | Sprague et al. | 358/474 |
| 7,446,907 B2 * | 11/2008 | Hosier et al. | 358/474 |
| 7,557,832 B2 * | 7/2009 | Lindenstruth et al. | 348/208.99 |
| 2002/0122133 A1 | 9/2002 | Ejima | |
| 2002/0181033 A1 * | 12/2002 | Tandon et al. | 358/514 |
| 2004/0212858 A1 * | 10/2004 | Hosier et al. | 358/510 |
| 2004/0233295 A1 * | 11/2004 | Hoshuyama | 348/222.1 |
| 2006/0072018 A1 * | 4/2006 | Inaba et al. | 348/208.99 |
| 2006/0274156 A1 * | 12/2006 | Rabbani et al. | 348/208.99 |
| 2007/0206238 A1 * | 9/2007 | Kawai | 358/482 |

* cited by examiner

IMAGE CAPTURE DEVICE WITH ROLLING BAND SHUTTER

BACKGROUND

1. Technical Field

This invention relates generally to image capture devices, and more specifically to an image capture device using a rolling band shutter to correct for device motion while capturing images.

2. Background Art

Photography is experiencing an explosion in popularity due to advances in technology. Digital cameras and digital imaging are fueling a new interest in photography. Not too long ago, the only way to capture an image was to use a film camera. A user adjusted and aimed the camera at a subject, and then took the picture. The user then had no idea what the picture looked like until they removed the film from the camera, took the film to a processing center, and had the film developed.

Digital cameras have revolutionized photographic process. With a digital camera, one points and shoots, seeing the image appear instantly on a display without the need of developing film. What's more, when the picture fails to turn out as planned, the user simply deletes the electronic image from memory and shoots again. The efficiency and low cost associated with digital photography is very appealing to consumers. It is so appealing, in fact, that digital cameras are showing up on all types of electronic devices, including mobile telephones.

One problem associated with photography, however, is that of camera shake. Camera shake occurs when there is subtle movement of the camera while taking a picture. This movement can make a subject appear blurred or out of focus. The problem is most pronounced in low light conditions where image sensor exposure times are long. This problem is also exacerbated in digital photography because the cameras and devices are sometimes very small and very light. Lightweight devices that fit easily in a pocket, while great for portability, are sometimes difficult to hold perfectly steady while taking pictures, especially in low light conditions.

Turning now to FIG. 1, illustrated therein is a prior art digital image capture device 101 in the process of taking a picture. As indicated by line 102, the digital image capture device 101 moved slightly while capturing an image of the subject 103. This motion could have been due to motion in a user's hand, motion of a vehicle in which the user was riding, wind, or any other cause. Regardless of cause, the result is clear in image 104: the subject looks blurry and out of focus.

One prior art solution to the camera shake problem is to take multiple pictures of the subject. Once several pictures have been taken, the pictures can be averaged with one another to eliminate some of the blur caused by camera shake. The problem with this solution, however, is threefold: First, the process of taking multiple images requires a large amount of memory in which to store these images. Second, the process of taking multiple images takes time. Where the subject is animated, for example an animal or person, the subject may move during this multiple picture taking process. Third, as camera resolutions are commonly in the four to six megapixel range, averaging multiple six-megapixel images requires extensive processing power, which can add cost to the overall image capture device.

There is thus a need for an improved image capture device and method that compensates for camera shake with reduced memory and shorter exposure duration.

Figure 1:
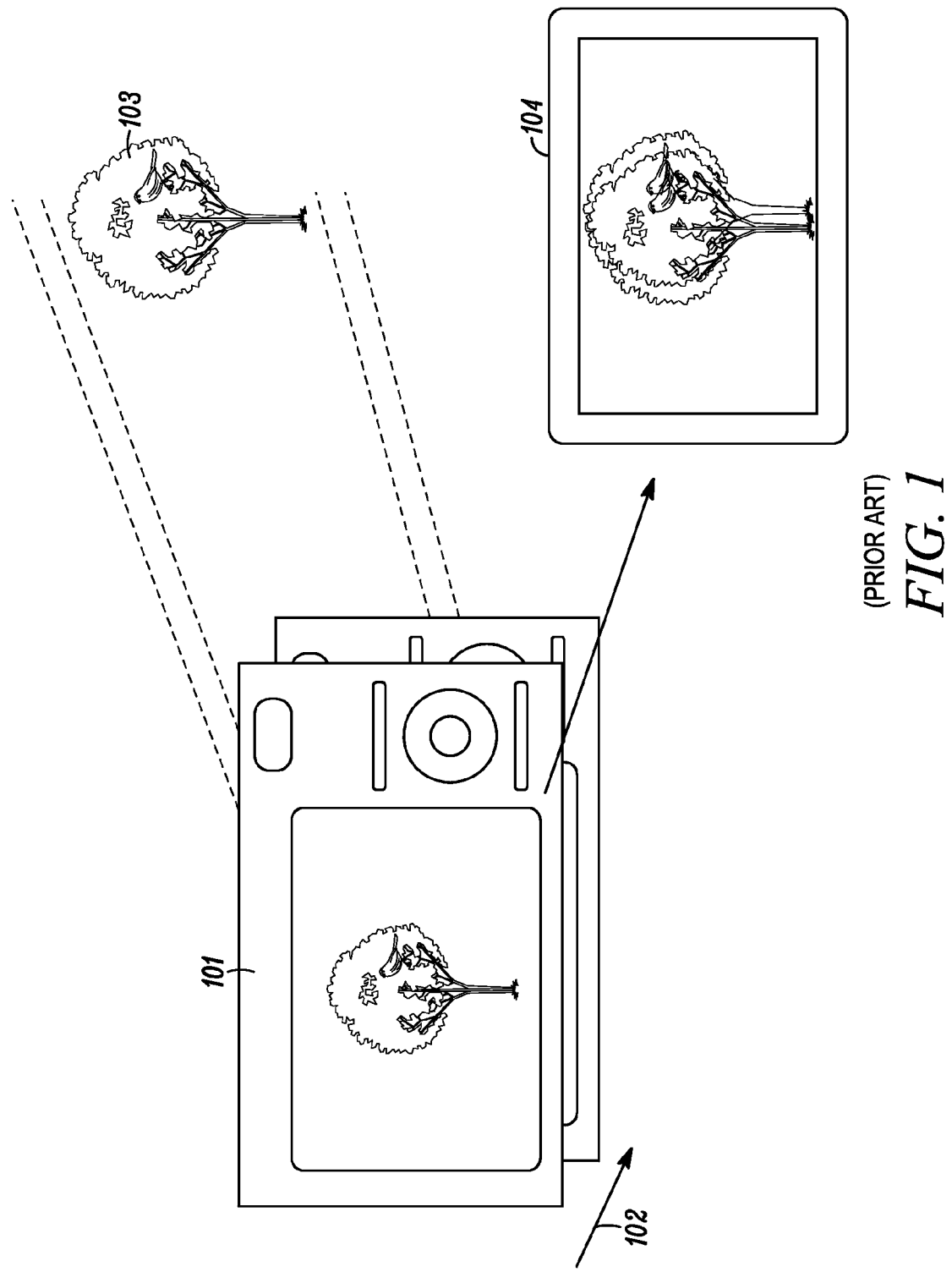
FIG. 1 illustrates a prior art image capture device experiencing camera shake while capturing an image.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to executing a rolling band shutter for image compensation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of rolling band shutters, image compensation, and camera shake correction. The non-processor circuits may include, but are not limited to, a radio receiver, a radio transmitter, signal drivers, clock circuits, power source circuits, and user input devices. As such, these functions may be interpreted as steps of a method to perform image capture with a rolling band shutter and camera motion correction. Alternatively, some or all functions could be implemented by a state machine that has no stored program instructions, or in one or more application specific integrated circuits, in which each function or some combinations of certain of the functions are implemented as custom logic. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As illustrated and described herein, an image capture device utilizing a rolling band shutter offers a device and method to correct for motion while capturing images. In contrast to the multiple-picture approach described above, in one embodiment of the present invention, a digital image sensor employs a rolling electronic shutter where only a few columns of pixels or photosites are activated to digitize incident light at any given point in time. This "band" of activated photosites sweeps across the digital image sensor, thereby sequentially acquiring digital values corresponding to the incident light. The width of the band at any given time will affect the exposure duration.

In one embodiment of the invention, multiple, partially concurrent scanning sweeps are used to capture an image. These multiple scanning sweeps are separated in time by a portional width of the digital image sensor. When a second scanning sweep acquires digital values from a pixel or photosite already captured by the first scanning sweep, the two digital values from the same photosite location may be compared to determine any movement of the digital image sensor during the image capture process. As the scanning sweeps are partially concurrent, less memory is required to store data for comparison. In one embodiment, the data from each scanning sweep may then be averaged after correcting for motion to further suppress noise that may be present. Sensor motion may be estimated from the bands themselves, or may be obtained from an external device. Embodiments of the invention are thus able to both correct blur due to motion and improve the overall signal to noise ratio.

Figure 2:
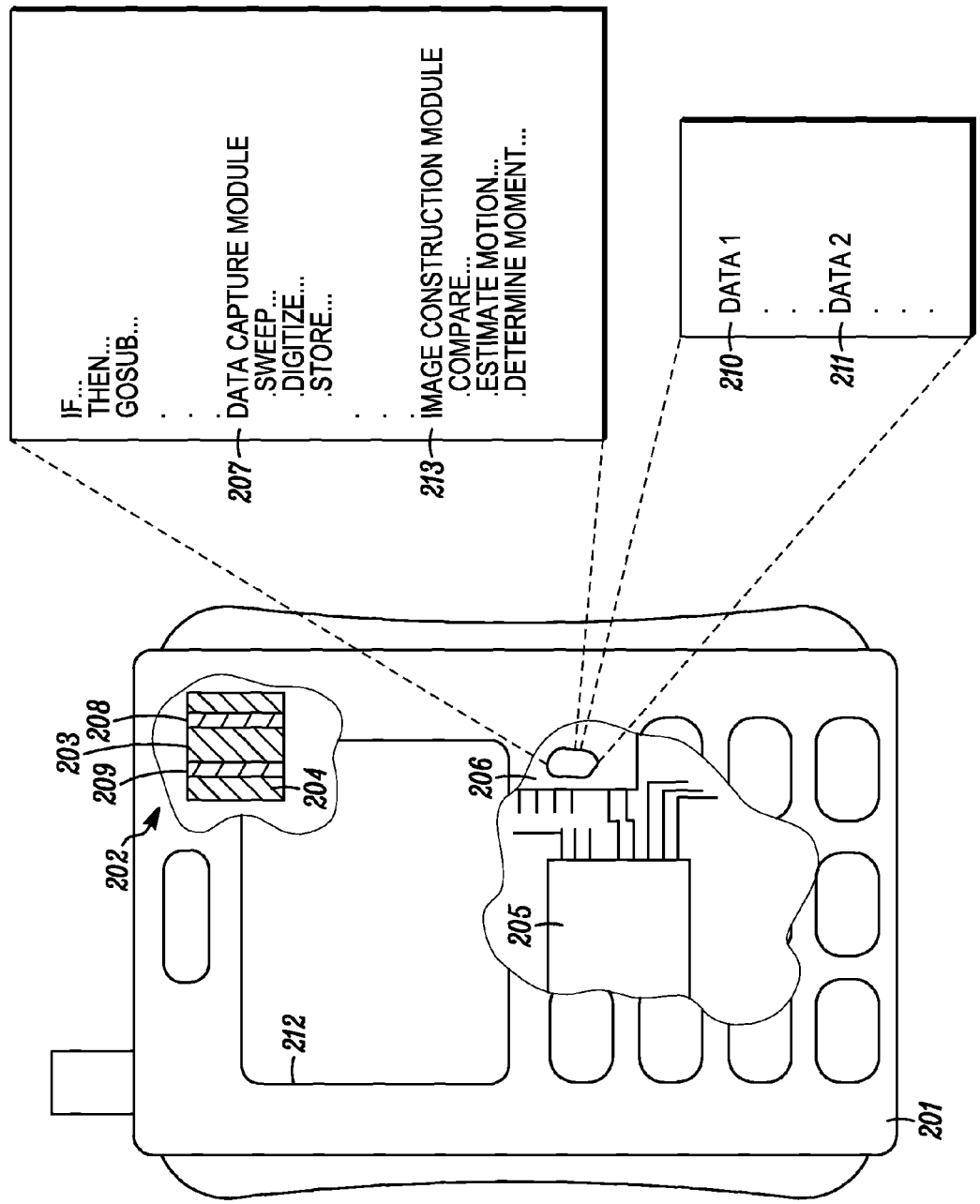
FIG. 2 illustrates one embodiment of an image capture device utilizing a rolling band shutter in accordance with the invention.

Turning now to FIG. 2, illustrated therein is one embodiment of a portable electronic device 201 comprising an image capture apparatus 202 in accordance with one embodiment of the invention. For the purposes of discussion, the exemplary embodiment of FIG. 2 is that of a telecommunication device, such as a mobile telephone or radiotelephone. One application for the present invention is that of communication devices having integrated digital cameras. However, it will be clear to those of ordinary skill in the art having the benefit of this disclosure that the invention is not so limited. Other devices, including portable computers, digital cameras, gaming devices, and the like may also employ the embodiments of the invention, as well as equivalents thereof.

The image capture apparatus 202 includes a digital image sensor 203. The digital image sensor 203, which may be a charge-coupled image sensor, complimentary metal oxide semiconductor device image sensor, or other type of image sensor, has a plurality of photosites 204 disposed along the digital image sensor 203. Each photosite 204 is an electronic or semiconductor device that receives light and converts it into digital electronic data.

A processor 205 or control circuit is coupled to the digital image sensor 203. The processor 205, which may be a microprocessor, programmable logic, or other device capable of executing an instructional code set, executes scanning sweeps of the digital image sensor 203. Where the processor 205 is a microprocessor or other equivalent device, memory 206 or memory module may be included for storing embedded software having instruction code sets for executing the scanning sweeps and image correction.

A data capture module 207, shown here as embedded firmware but which may be a hardware device, is configured to initiate multiple scanning sweeps of the photosites 204. The multiple scanning sweeps may include any number of scanning sweeps. For example, while two scanning sweeps will be illustrated herein for discussion, three, four, or more scanning sweeps may equally be used.

Each scanning sweep obtains a set of digital data values corresponding to incident light upon the plurality of photosites 204. In one embodiment, the multiple scanning sweeps 208,209, represented as bars of photosites in FIG. 2, are at least partially concurrent. Partially concurrent means that the second scanning sweep 209 is occurring for at least a partial duration in which the first scanning sweep 208 is occurring. Said differently, partially concurrent means that at least a second scanning sweep is initiated prior to completion of a preceding scanning sweep.

Each set of digital values, i.e. a first set of digital values 210 obtained from first scanning sweep 208 and a second set of digital values 211 obtained from second scanning sweep 209, form at least a partial image of the image received by the digital image sensor 203. These sets of digital values 210, 211 may be stored in memory 206 as binary data. The processor 205 may retrieve binary image data from memory 206 for presentation on a display module 212.

An image construction module 213, operable with the processor 205, is configured to compensate for differences between ones of the first set of digital values 210 and corresponding ones of the second set of digital values 211. In other words, when the first scanning sweep 208 receives a digital value from a specific photosite, that digital value may be compared with a digital value obtained from the same photosite during the second scanning sweep 209. By comparing ones of the first set of digital values 210 with corresponding ones of the second set of digital values 211, an amount of motion may be estimated. Such motion estimation may be performed by determining a moment between the first set of digital values 210 and the second set of digital values 211. Motion estimation by comparing digital data is known in the art. For example, various methods are taught by U.S. Pat. No. 5,157,742 to Niihara, issued Oct. 20, 1992, entitled "Motion image data compression system," U.S. Pat. No. 6,891,890 to Auyeung et al., issued May 10, 2005, entitled "Multi-phase motion estimation system and method," and U.S. Pat. No. 6,934,332 to Auyeung et al., issued Aug. 23, 2005, entitled "Motion estimation using predetermined pixel patterns and subpatterns," which are incorporated herein by reference. In conjunction with the image construction module 213, the processor 205 is configured to compensate for motion of the portable electronic device 201 by comparing ones of the first set of digital values 210 with ones of the second set of digital values 211.

Figure 3:
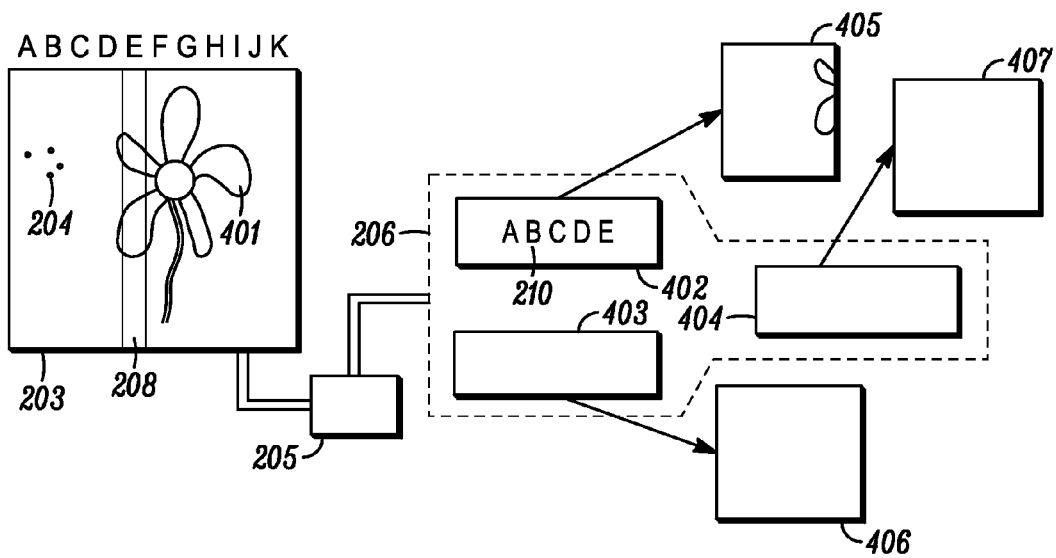
FIGS. 3, 4, and 5 illustrate one embodiment of an image capture device having a rolling band shutter executing multiple scanning sweeps to obtain digitized data.
Figure 4:
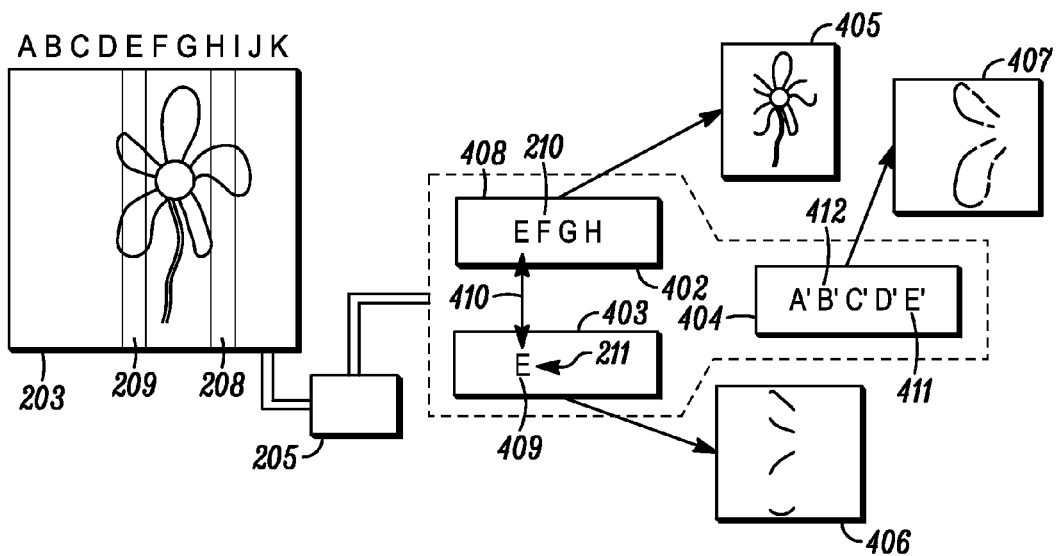
Figure 5:
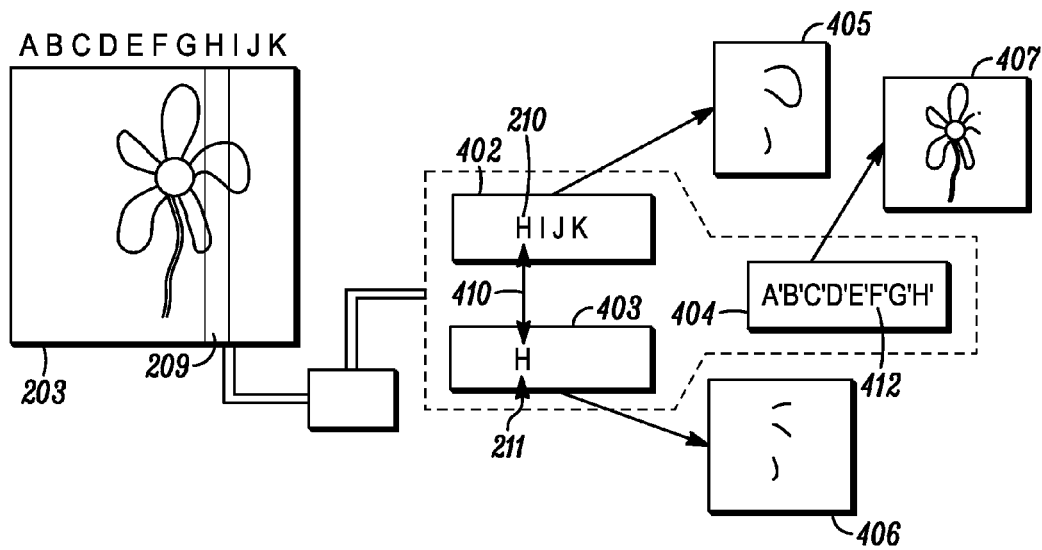

Turning now to FIGS. 3, 4, and 5, illustrated therein are time lapse views of scanning sweeps 208, 209 of a digital image sensor 203, along with storage and processing of digital values, to obtain a compensated image in accordance with one embodiment of the invention. Beginning with FIG. 3, the digital image sensor 203 is receiving incident light from a subject 401, shown illustratively as a flower. To simplify the discussion, the digital image sensor has been graphically divided into subsections A-K, which represent groups of photosites 204 on the digital image sensor. While 11 subsections are shown, it will be clear that a digital image sensor 203 with a multi-megapixel resolution may include far more subsections, as a string of one or more photosites 204 may constitute any one subsection.

A first scanning sweep 208 passes across the digital image sensor 203 to obtain a first set of digital values 211. The first set of digital values 210 is stored in a first buffer 402 in memory. As shown in FIG. 3, since the first scanning sweep 208 has progressed from subsection A to subsection E, corresponding digital values 210 are disposed within the first buffer 402.

As the second scanning sweep has not yet been initiated, there are no digital values in the second buffer 403. Similarly, since no comparison between digital values has occurred, there are no digital values stored in the third buffer 404, which will ultimately include digital values for the final image.

To help with the discussion, image representations of each buffer are also shown. For example, image 405 illustrates an image corresponding to the digital values stored in the first buffer 402. As digital values from subsections A through E have been stored, the first set of digital values 210 in FIG. 3 comprise a partial image of the subject 401, which is shown in image 405. As no values are presently stored in buffers 403 and 404, image 406 and image 407 are blank.

Turning now to FIG. 4, the first scanning sweep 208 has progressed across the digital image sensor 203 to subsection H. A second scanning sweep 209 is now progressing across the digital image sensor 203. The second scanning sweep 209 was initiated prior to the completion of the first scanning sweep 208, and is thus partially concurrent with the first scanning sweep 208.

As the first scanning sweep 208 and second scanning sweep 209 progress, ones of the first set of digital values 210 are compared with ones of the second set of digital values 211. For instance, first digital values obtained from subsection E 408 during the first scanning sweep 208 are compared to second digital values obtained from subsection E 409 during the second scanning sweep 209 at 410. During this comparison, the image construction module (213) estimates an amount of motion between the first digital values obtained from subsection E 408 and the second digital values obtained from subsection E 409. The image construction module (213) then compensates for this motion and writes the resultant digital value 410 to the third buffer 404.

This comparison permits the first digital values 210 and second digital values 211 to each represent partial images, in that the first buffer need only hold data until the second scanning sweep 209 catches up with subsections that have been scanned by the first scanning sweep 208. In other words, the second scanning sweep 209 is displaced from the first scanning sweep by a portional width 411 of the digital image sensor 203. This portional width 411 comprises a set of photosites, and thus corresponds to a set of digital values, that is greater than an amount of photosites disposed within the portional width 411, but which is less than an amount of photosites disposed within the digital image sensor 203.

By way of example, the first buffer 402 must retain data values trailing back to subsection E until the second scanning sweep 209 obtains digital values from subsection E. Once this occurs, the image construction module (213) may compare digital values from subsection E, estimate movement, compensate, and then write the resultant values 412 to the third buffer 404. Then, ones of the first set of digital values 210 and corresponding ones of the second set of digital values 211 may be purged from memory 206.

Looking to FIG. 4, the first buffer 402, the first set of digital values 210 comprise digital values from subsections E, F, G, and H. These digital values comprise a partial image, shown in image 405. The second buffer 403, meanwhile, has the second set of digital values 211 that comprise digital values from subsection E. These digital values correspond to a partial image shown in image 406. The second set of digital values 211 includes fewer values than the first set of digital values 210. The compared and compensated digital values 410 are written to the third buffer 404. The resultant image is shown in image 407.

Turning now to FIG. 5, the first scanning sweep (208) is complete, and the second scanning sweep 209 has progressed across the digital image sensor 203 to subsection H. The first set of digital values 210 stored in the first buffer 402 includes digital values from subsections H-K, which correspond to the partial image shown in image 405. The second set of digital values 211 includes digital values from at least subsection H. These values correspond to the partial image shown in image 406. The image construction module (213) compares the digital values of subsection H at 410, estimates an amount of motion by determining a moment, and writes the resulting values 412 to the third buffer 404. The corresponding image is shown in image 407.

Once each of the ones of the first set of digital values 210 are compared to the corresponding ones of the second set of digital values 211, a completed image will be stored in the third buffer 404. This completed image is corrected for digital image sensor motion during the image capture process.

Figure 6:
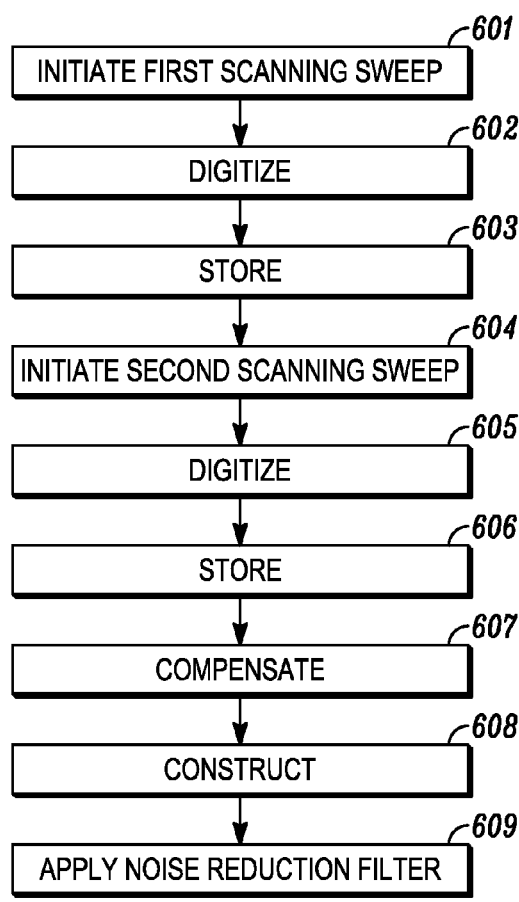
FIGS. 6 and 7 illustrate one embodiment of a method for compensating for camera shake in accordance with the invention.

Turning now to FIG. 6, illustrated therein is one embodiment of a method for motion compensation in a digital image capture apparatus having an image sensor comprising groups of photosites in accordance with the invention. At step 601, a processor (205), operating in conjunction with appropriate modules (207,213), initiates a first scanning sweep (208) of the groups of photosites. The first scanning sweep (208) obtains a first set of digital values (210) resulting from a digitization 602 of incident light upon the groups of photosites. The first set of digital values (210) obtained from the first scanning sweep (208) are stored in memory (206) at step 603.

At step 604, the processor (205) initiates a second scanning sweep (209). In one embodiment, the second scanning sweep (209) is initiated prior to the completion of the first scanning sweep (208). Digitization 605 of incident light during the second scanning sweep (209) yields a second set of digital values (211), which are stored in memory (206) at step 606. As the first scanning sweep and second scanning sweep are partially concurrent, the second set of digital values (211) may include less values than the first set of digital values (210). Both the first set of digital values (210) and the second set of digital values (211) comprise a partial image.

Figure 7:
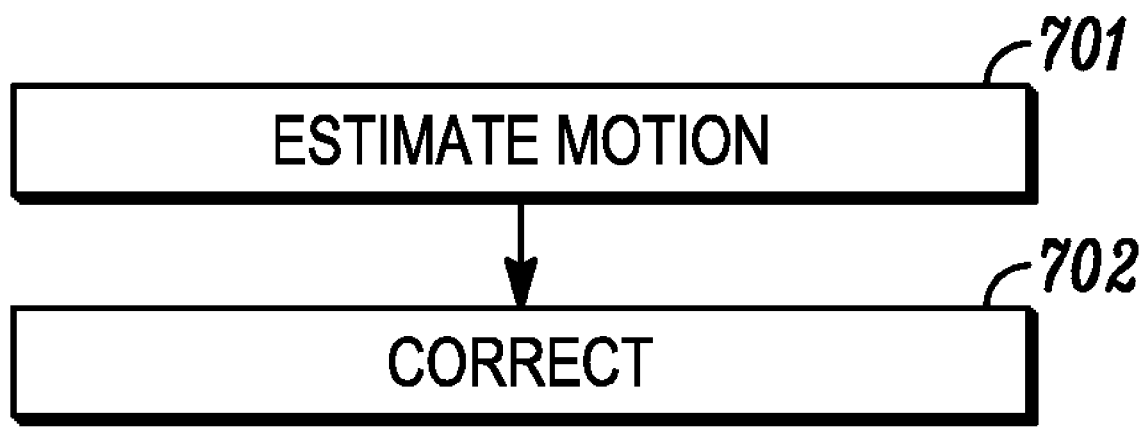

At step 607, an image construction module (213) compensates for changes, which may be due to image sensor motion, between the first set of digital values (210) and the second set of digital values (211). Turning briefly to FIG. 7, in one embodiment, the step of compensating (607) includes estimating 701 an amount of motion in the image capture apparatus by comparing the first set of digital values (210) with the second set of digital values (211). The step of estimating may be performed by determining a moment between ones of the first set of digital values (210) and ones of the second set of digital values (211). Correction for the estimated amount of motion occurs at step 702.

Turning back to FIG. 6, at step 608 the image construction module (213) constructs a resulting image at step 608. In one embodiment, to further enhance the resulting image, a noise reduction filter may be applied at step 609. This noise filter can be applied to ones of the first set of digital values (210), ones of the second set of digital values (211), resulting values (412), or combinations thereof.

The noise reduction filter may take various forms. For example, in one embodiment, the step of applying a noise reduction filter 609 may include averaging ones of the first set of digital values (210) with ones of the second set of digital values (211). In another embodiment, the step of applying a noise reduction filter 609 may include determining a geometric mean between ones of the first set of digital values (210) and ones of the second set of digital values (211). The application of a noise reduction filter helps to improve the overall signal to noise ratio of the resulting image.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A digital image sensor comprising:
   a. a plurality of photosites disposed along the digital image sensor; and
   b. a data capture module configured to initiate multiple scanning sweeps of the plurality of photosites to obtain sets of digital values corresponding to incident light upon the plurality of photosites,
   wherein the multiple scanning sweeps are at least partially concurrent,
   wherein the sets of digital values each comprise a partial image.

2. The digital image sensor of claim 1, wherein the multiple scanning sweeps comprise a first scanning sweep to obtain a first set of digital values and a second scanning sweep to obtain a second set of digital values.

3. The digital image sensor of claim 2, further comprising an image construction module configured to compensate for differences between ones of the first set of digital values and corresponding ones of the second set of digital values.

4. The digital image sensor of claim 3, wherein the image construction module is configured to estimate an amount of motion of the digital image sensor by comparing the ones of the first set of digital values with the corresponding ones of the second set of digital values.

5. The digital image sensor of claim 3, wherein the image construction module is configured to estimate an amount of motion by determining a moment between the ones of the first set of digital values with the corresponding ones of the second set of digital values.

6. The digital image sensor of claim 3, wherein the second set of digital values includes fewer digital values than does the first set of digital values.

7. The digital image sensor of claim 1, further comprising a memory module coupled to the data capture module, wherein the memory module is configured to store both the digital values obtained from each of the multiple scanning sweeps.

8. A method for motion compensation in a digital image capture apparatus comprising an image sensor having groups of photosites, the method comprising the steps of:
   a. initiating a first scanning sweep of the groups of photosites, the scanning sweep comprising a digitization of incident light upon the groups of photosites;
   b. storing a first set of digital values obtained from the first scanning sweep;
   c. prior to completion of the first scanning sweep, initiating a second scanning sweep of the groups of photosites;
   d. storing a second set of digital values obtained from the second scanning sweep;
   e. compensating for changes between the first set of digital values and the second set of digital values; and
   f. constructing an image.

9. The method of claim 8, wherein the step of compensating comprises:
   a. estimating an amount of motion in the image capture apparatus by comparing the first set of digital values with the second set of digital values; and
   b. correcting for the amount of motion.

10. The method of claim 9, wherein the step of estimating the amount of motion comprises determining a moment between ones of the first set of digital values with ones of the second set of digital values.

11. The method of claim 9, further comprising the step of applying a noise reduction filter to the one of the first set of digital values, the second set of digital values or combinations thereof.

12. The method of claim 11, wherein the step of applying a noise reduction filter to the one of the first set of digital values, the second set of digital values, and combinations thereof comprises averaging ones of the first set of digital values with corresponding ones of the second set of digital values.

13. The method of claim 11, wherein the step of applying a noise reduction filter to the one of the first set of digital values, the second set of digital values, and combinations thereof comprises determining a geometric mean between the ones of the first set of digital values and the corresponding ones of the second set of digital values.

14. The method of claim 9, wherein both the first set of digital values and the second set of digital values comprise a partial image.

15. The method of claim 9, wherein the second scanning sweep is displaced from the first scanning sweep by a portional width of the image sensor, wherein the first set of digital values comprises a set of values greater than an amount of photosites disposed within the portional width of the image sensor and less than an amount of photosites disposed within the image sensor.

16. A portable electronic device comprising:
   a. an image capture apparatus comprising:
      i. a digital image sensor comprising a plurality of photosites; and
      ii. a data capture module coupled to the digital image sensor, the data capture module being configured to initiate a first scanning sweep of the plurality of photosites to obtain a first set of digital values, the data capture module being further configured to, prior to completion of the first scanning sweep, initiate a second scanning sweep to obtain a second set of digital values;
   b. a processor coupled to the image capture apparatus; and
   c. a display module;
   wherein the processor is configured to compensate for motion of the portable electronic device by comparing ones of the first set of digital values to ones of the second set of digital values.

17. The portable electronic device of claim 16, wherein each of the first set of digital values and the second set of digital values comprises a partial image.

18. The portable electronic device of claim 17, wherein the processor is configured to determine a moment between the ones of the first set of digital values and the ones of the second set of digital values.

19. The portable electronic device of claim 17, wherein the digital image sensor comprises one of a charge coupled device and a complimentary metal oxide semiconductor device.

20. The portable electronic device of claim 17, wherein the portable electronic device comprises a radiotelephone.

* * * * *